March 3, 1964 B. G. HOOD 3,123,403
AUTOMOBILE ARM REST

Filed Dec. 21, 1962 4 Sheets-Sheet 1

INVENTOR.
BRUCE G. HOOD
BY
*Russell, Chittick & Pfund*
ATTORNEYS

March 3, 1964      B. G. HOOD      3,123,403

AUTOMOBILE ARM REST

Filed Dec. 21, 1962      4 Sheets-Sheet 3

INVENTOR.
BRUCE G. HOOD
BY
ATTORNEYS

March 3, 1964    B. G. HOOD    3,123,403
AUTOMOBILE ARM REST
Filed Dec. 21, 1962    4 Sheets-Sheet 4

INVENTOR.
BRUCE G. HOOD
BY
ATTORNEYS

United States Patent Office

3,123,403
Patented Mar. 3, 1964

3,123,403
AUTOMOBILE ARM REST
Bruce G. Hood, Marblehead, Mass., assignor to Davidson Rubber Company, Dover, N.H., a corporation of New Hampshire
Filed Dec. 21, 1962, Ser. No. 246,626
7 Claims. (Cl. 297—412)

This invention relates to padded articles, and more particularly to articles wherein a padded element is covered by a surface material and the entire article is supported from within by a reinforcing and attaching member.

This application is a continuation-in-part of Ser. No. 757,441, "Padded Element and Process for Making the Same," filed August 20, 1958.

In one aspect this invention is concerned particularly with the production of upholstered elements, such as arm rests employed in the automotive industry. Such arm rests are normally secured to the side wall or door of a vehicle and provide a rest for the elbow or forearm of the occupant. In the past such arm rests have generally comprised a group of assembled parts, one of which was secured to the door or wall for support purposes and another of which comprised a padded element mounted on the support. The labor cost in the assembly of such multi-piece arm rests had led the industry over the years to search for one piece or integral arm rest. In addition to the assembly costs, however, the multi-piece arm rests have had other disadvantages. In general, they have employed a plastic support piece which protrudes, is both a safety hazard and uncomfortable, and is easily broken if accidentally slammed against articles on the vehicle seat.

One alternative proposed for these multi-piece arm rests has been an arm rest employing a pair of surface shells or skins of a thermoplastic vinyl compound heat sealed over a pad which was previously formed around an internal reinforcing member. These latter arm rests have never reached any substantial commercial success because their cost was high, due to the extra handling involved in heat sealing the shells. In addition, the heat sealed vinyl skins remained relatively loose on the foam pad so that they wrinkled easily and the heat sealing inevitably left a sharp, unsightly and protruding seam. Another disadvantage of these heat sealed arm rests was that a thin vinyl covering had to be used. This rendered the arm rest more vulnerable to tearing or deterioration than desired.

It is, therefore, an object of my invention to provide a seamless integral padded article not requiring special assembly steps and in which a soft padded element is covered with a flexible and durable surface material or skin without the presence of any protruding seams and in firm bonded relation to the padded element. In addition, it is an object to provide such an article with a relatively thick and durable covering.

The accomplishment of this and other objects of my invention involves the solution of a surprisingly large number of problems. It was relatively simple to vacuum form a vinyl sheet having a grained surface on it over a padded member in two half-shells and then to join the shells by heat sealing, but when the object is to use a single hollow shell or skin without seams in it, and also to provide a simulated leather grained surface, the problem then becomes substantially complicated. Therefore, a second object of my invention is to produce an arm rest as above stated, in which the outer surface is substantially seamless and has a grained appearance.

Another problem arising in the successful commercial production of such an arm rest relates to manufacturing molds of the proper size and shape. It is but a simple task when split molds are employed, as in the previously manufactured arm rests, but when a seamless shell is desired and the item must be formed under conditions of relatively accurate registration, the problem is again additionally complicated. Accordingly, a further object of my invention is to provide a system for fabricating molds for use in mass production of integral padded elements of the type described.

Another problem arises from the manufacture of seamless shells. It has long been known that such shells can be made by rotational molding, but the thickness of the wall of the shell obtained in notoriously non-uniform. Variations in thickness result from uneven contours such that a heavier build-up usually occurs in corners or angles, but even with simple shapes the material tends to agglomerate more in some places than in others at random. Thus, accurate reproduction on a large scale with a minimum of rejects is very difficult, and accordingly it is still another object of my invention to provide a process for making padded elements in which the disconformities incident to molding the shells are compensated for.

In the accomplishment of these and other objects of my invention, I rotationally mold a vinyl shell within a hollow seamless electro-form mold which has a grained interior surface. During this rotational molding the vinyl shell is heated and cured under high temperature; and, after molding, it is collapsed and withdrawn from the mold through a relatively small pouring hole. Thereafter the vinyl shell is placed in a retaining mold, the internal reinforcing and attaching member is inserted into the vinyl shell, a foaming urethane resin is poured into the shell, and the retaining mold is closed. Subsequently the urethane foam expands filling out the cavity of the vinyl shell, and at the same time bonding itself integrally and under pressure to the inside of the vinyl shell, as well as to the reinforcing and attaching member.

It is a feature of my invention that I produce in a relatively few steps an integrally formed, one-piece padded element which completely obviates any steps in assembling the padded element and support after fabrication. In addition, no uncomfortable or breakable supporting elements project, a grained substantially seamless surface is presented, and the article is covered by a thick durable covering.

One feature of my invention is that the random disconformities from shell to shell are eliminated by curing the foam in such a way that the pressure of the foam urges the shell into a female mold of the desired shape and size of the end product. Another feature is that the padded article of my invention is particularly strong along its corners, thus obviating or reducing the necessity for internal reinforcing.

In brief compass, a preferred embodiment of this invention is an integral one-piece padded automobile arm rest consisting of a flexible substantially seamless plastic shell reinforced with metal reinforcing member and firmly filled with an expanded foam of a thermosetting resin. The plastic shell has a grained or textured outer surface. It is preferably generally triangular in cross-section and has an upper horizontal wear and pressure receiving surface to support the arm of an occupant of the automobile. The upper surface has longitudinally extending corners with the plastic of the shell being substantially thicker at these corners than elsewhere. One side of the shell is a vertical side wall at right angles to the upper surface for mounting the arm rest to the door or wall panel. The reinforcing member has a horizontal upper surface that parallels and is coextensive with the wear and pressure receiving surface of the shell to support it but is spaced therefrom to permit the foam to impart resiliency to the shell at this point. The reinforcing member has at least one mounting bracket positioned relative to the vertical side wall. The bracket is adapted to permit mounting of the arm rest to the automobile. The cured thermosetting resin foam, preferably a urethane foam, completely and firmly fills the plastic shell by virtue of its being foamed in place under conditions where the shell is forced to slightly expand, which also assures that the shell has a smooth, taut surface. The foam bonds well to the interior wall of the plastic shell, which is preferably formed from a vinyl resin, and to the reinforcing member thus imparting rigidity besides resiliency.

The side wall of the plastic shell opposite the vertical mounting side wall preferably angles or tapers from the upper surface to the lower edge of the vertical side wall, and has preferably a recessed arc communicating with the mounting bracket to permit the insertion of mounting screws therein.

The center portion of the upper horizontal surface, and the side wall extending downwardly therefrom, is preferably recessed or cut back to form a longitudinally extending edge or corner that can be gripped by the hand. Two portions of the vertical side wall are left one either side thereof for attaching the arm rest to the automobile.

Various further objects and features of my invention will be described more in detail below, including the means employed for producing a grained surface in the mold, and the various other techniques employed. In the drawings.

Figure 1:
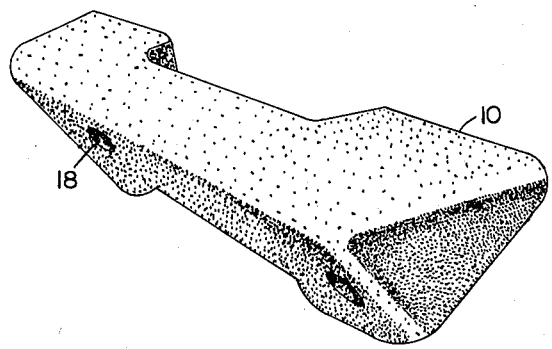
FIG. 1 is a view in perspective of an arm rest made in accordance with my invention.
Figure 2:
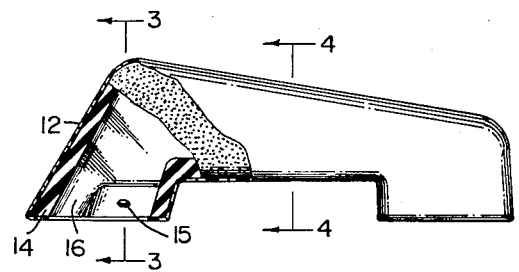
FIG. 2 is a plan view of the arm rest shown in FIG. 1 showing a portion broken away to expose its interior components.
Figure 4:
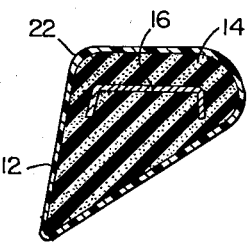
FIG. 4 is a view in cross section taken along the lines 4—4 of FIG. 2.
Figure 3:
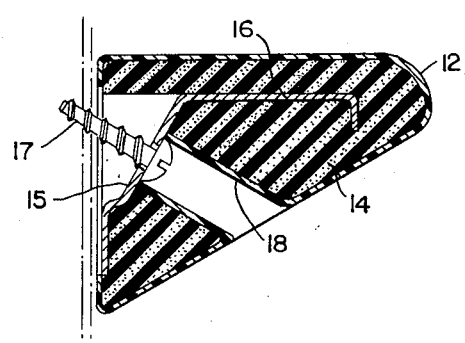
FIG. 3 is a view in cross section taken along the lines 3—3 of FIG. 2.
Figure 5:
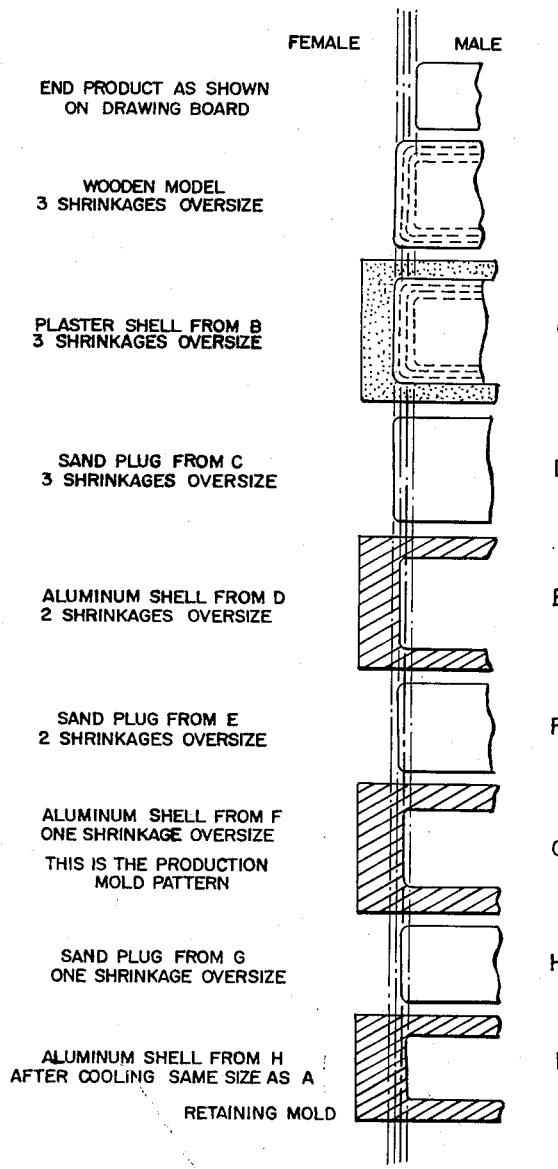
Figure 6:
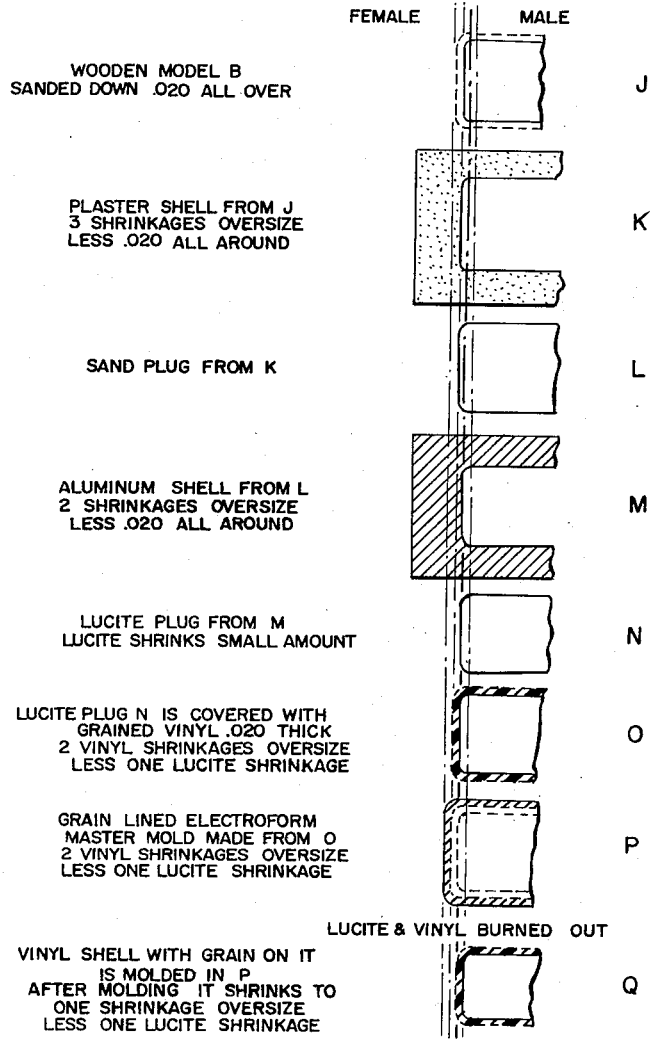
Figure 7:
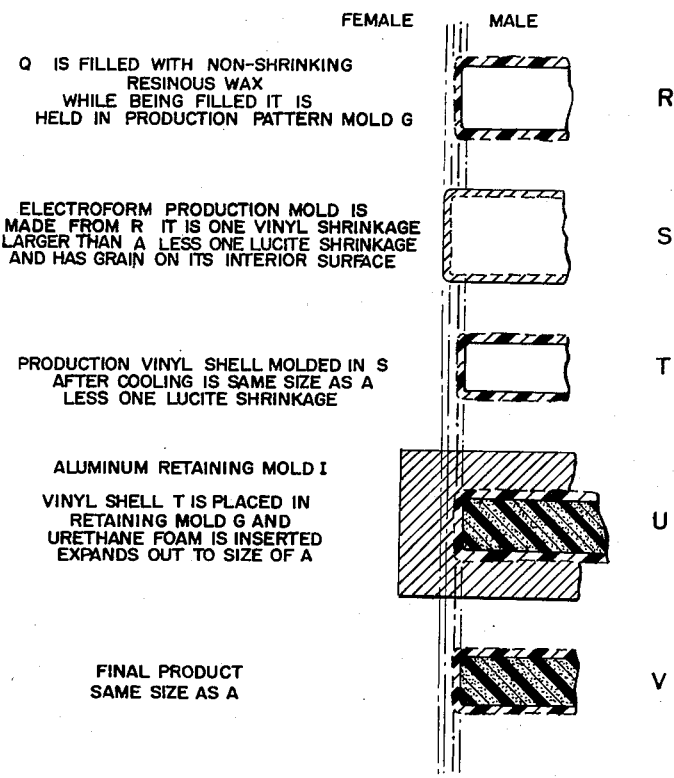

FIGS. 5, 6 and 7 combine to form a diagram graphically representing the sequence of steps employed in making the molds and in fabricating the final production.

In describing the preferred embodiment of my invention, I will continuously refer to a vehicle arm rest, although it will be understood that other padded elements, such as visors, pads and the like can be made employing the process of my invention.

In FIGURES 1–4 a composite arm rest 10 is shown. In its structure the arm rest 10 includes a vinyl shell or skin 12 completely filled with urethane foam 14, which is in closely adherent relation with the vinyl shell 12. A reinforcing and attaching member 16 is also located within the shell 12 surrounded by and in closely adherent relation with the urethane foam. The arm rest 10 may be attached to a vehicle wall or door by means of machine screws 17 communicating through a bracket 15 in member 16 and shell 12 to the vehicle wall or door. Recessed portions 18 are provided in some models for the purpose of hiding the attaching screw from view as well as leading the attaching screws directly to the appropriate point on the member 16. The presence of these recessed portions 18 also facilitate accurate registration of the member 16 during molding, as will be described below.

The sequence of steps employed in making the basic patterns and retaining molds is shown in FIG. 5 and is essentially as follows. It will be understood that a print or drawing of the finished article will be provided by the customer. This is shown in FIG. 5 as indicated at the letter A. The first step in the process then is to construct a wooden or plastic model B which is somewhat larger than the drawingboard sample A. The wooden model B is used in making various aluminum molds to be described later, and the amount by which the wooden model B is larger than the drawingboard sample A is gauged in relation to the amount of shrinkage aluminum will take during the casting stages. This shrinkage dimension will be referred to herein simply as an "aluminum shrinkage," and it will be understood that the wooden model B is three aluminum shrinkages larger than the drawingboard sample A.

In FIGURES 5, 6 and 7, I have shown the various shrinkages as being equal on the sides and ends as though the article were a cube or sphere. It will be understood, however, that a long, thin article will shrink substantially more in the longitudinal dimension than in the transverse dimension, and the shrinkage dimensions shown in the drawings will vary in proportion and accordingly.

The wooden model B is employed to form a split plaster female mold or shell indicated at C, which will likewise be three aluminum shrinkages over-size. A sand plug D is made employing the plaster shell C, and thereafter a split aluminum female mold or shell E is made employing D as a plug. As the mold E cools, it contracts to a size which is approximately two aluminum shrinkages larger than the drawingboard sample A. Again, a sand plug F is taken from mold E and another aluminum shell G is made therefrom which on cooling is approximately one aluminum shrinkage larger than the drawingboard sample A. This mold G is employed in a later stage of the process as will be described more in detail below.

A sand plug H is formed from the female mold G and is used to make a third aluminum split female mold indicated at I. This mold I is called the "retaining mold," and after casting it contracts to approximately the same internal dimension as the external dimension of the drawingboard sample A.

FIGURES 7 and 8 show the steps used in making the vinyl shell production molds which have the grain interior surface, and also the steps involved in making the arm rests. The starting point for these latter steps is shown at J where the wooden model B is sanded down all over by .020″. This is done with accuracy by sinking pinholes into the model B across its entire surface to a depth of .020″ and then sanding until the pinholes disappear. The result is to leave model B three aluminum shrinkages larger than the drawingboard sample A less .020″ all over. From this altered wooden model which I will now refer to by the letter J, I form a female plaster shell K, and in turn a sand plug L. It being understood that the sand plug L is now approximately three shrinkages over-size .020″ all around. An aluminum, female split mold M is then cast employing the plug L, and after cooling, it shrinks to a dimension approximately two shrinkages over-size less .020″ all around. The mold M is then employed to rotationally mold a hollow Lucite plug N, which shrinks a very small amount not shown in FIGURES 6 and 7.

At this stage I now have a hollow Lucite plug N which is approximately two shrinkages larger than the drawingboard sample A less .020″ on all surfaces. In this condition, I cover the plug N with a vinyl sheet .020″ thick which has been embossed to provide a simulated leather grain. The covering operation is usually performed by a vacuum forming process in which the arm rest is held rigidly at its base and the vinyl is drawn and stretched around the plug N by vacuum. In addition to the vacuum, it is usually necessary to assist the formation operation by pulling, stretching and manually re-positioning the vinyl to accommodate it to the contour of the Lucite plug N. The degree of this adjustment is, of course, dependent on the contour of the desired end product. If the contour of the end product is difficult to accommodate with a single sheet of vinyl, excellent results can be attained by employing more than one piece of vinyl, filling in the cracks with wax, and hand engraving the wax to eliminate the appearance of a seam. A suitable adhesive is employed in securing the vinyl sheet to the Lucite plug N.

The vinyl covered element O, therefore, is larger than the drawingboard sample A by two shrinkages, and is without seams except for a relatively small portion at the base of the arm rest.

The covered plug O is then employed to make an electro-form master mold P. This is done by electroplating techniques in which the plug O is treated to give it a conductive surface, and thereafter plated with a thick heavy layer of copper or other suitable metal. Thereafter the Lucite and vinyl of the plug O are burned out leaving the electro-form master mold P as a hollow shell. The master mold P has on its interior surface the impression of the grain surface of the covered plug O.

Thus the master mold P is two vinyl shrinkages larger than the drawingboard sample A, and is used in producing a series of vinyl shells Q which are in turn used for the manufacture of production molds. The vinyl shells Q after formation shrink down to approximately one shrinkage larger than the drawingboard sample A and have on their surfaces the grain impression of the inside of the master mold P. It will be understood that the electro-form master mold P is a hollow female mold with a small pouring hole. The vinyl shells Q are formed in the preferred embodiment by rotational molding, and once they are formed, they are collapsed within the master mold P and withdrawn through the pouring hole. These vinyl shells Q are then filled with a substantially non-shrinking resinous wax while being held in the mold G. This forms a plug indicated at R which is approximately one shrinkage larger than the drawingboard sample A. The plug R is then employed in making an electro-form production mold S, which is one shrinkage larger than the drawingboard sample A, and has on its surface the simulated leather grain originally taken from the vinyl skin on the Lucite plug O. Following the formation of the production mold S, the wax and vinyl are melted out and the mold S is then in condition for manufacturing production vinyl shells indicated at T. Thus since the production mold S is substantially one shrinkage larger than the desired final size for the arm rest, the vinyl shells T, upon contraction, come to a size which is almost the same as the drawingboard sample A. It will be remembered, however, that in molding the Lucite plug N a small amount of shrinkage took place. This Lucite shrinkage carries through and in the final stages the vinyl shells T are one Lucite shrinkage smaller than the drawingboard sample A.

The production vinyl shells T are then placed in the retaining mold I as indicated at U. At this same time, the metal reinforcing and attaching member 16 is placed in the shell T and positioned relative to the mold I where it is supported by Teflon bosses in the retaining mold standing up into recesses 18. Thereafter, a metered amount of urethane foam is introduced into the shell through the pouring hole following which a retaining cap is placed on the mold. The urethane foam then expands by virtue of the release of gas within the foaming materials, and fills out the cavity of the production shell T. This expansion is caused by the evolution of gas in the urethane resin as it cures, and requires the provision of some means for venting the air or gas in the cavity of the production shell T to make room for the foam. In this preferred embodiment I do this by piercing the production shell T with a multiplicity of pinholes which are adapted to let the gas escape but not the foam. These pinholes are also formed with care so as to avoid weakening the vinyl shell. I do this by forming the pinholes with essentially smooth walls so as not to promote the development of harmful cracks in the surface of the vinyl shell. The size of the pinholes is gauged to permit the passage of gas through the shell, but to retain the foam. Apparently when the urethane foam finds its way to these holes, it seems to block its own passage through, somewhat in the manner of a gland seam employed in steam lines. Thus it is thought that the expansion of the urethane foam within the hole itself sets up a back pressure preventing further entrance of urethane into that hole, and also incidentally retarding further passage of gas through that same hole. This latter feature is important in ensuring molding the foam under pressure in the shell T, and in promoting a complete and uniform distribution of the foam through constrictions in the contour of the arm rest and between the insert 16 and the shell 12. Similar considerations must be taken with regard to the spacing between the vinyl shell T and the retaining mold I because the foam must not flow too far around the outside of the shell T. I have found that the spacing provided by the Lucite shrinkage dimension is adequate when a foam of the required gell strength is employed. It will be understand, of course, that a critical relationship exists between the gell strength of the foam and the dimensions of the constriction through which it attempts to pass, and in the case of the spacing between the shell and the mold, I attempt to achieve sufficient spacing to permit the foam to expand the shell T and compensate for random disconformities in the shells, but at the same time prevent any appreciable seepage of foam around the shell T into the retaining mold I.

Thus as the urethane expands, the various pinholes become inoperative through the presence of the urethane foam, and the area of the pouring hole becomes sealed off, the foam commences to exert pressure on the inside of the production shell T causing the same to push outwardly and abut against the inner wall of the retaining mold I. In this condition the urethane foam cures, and the resulting product is a very firmly bonded, compact, integral arm rest.

It will now be seen that the article of my invention has numerous advantages. In the first place, I have produced an integral arm rest having a grained surface substantially without seams. In addition, my arm rest has no hard or frangible exposed supporting elements. Thus comfort is not impaired nor the safety hazard increased. In addition, being fully padded and integrally bonded, my arm rest can withstand substantial shock without rupture.

As to cost, the process by which I manufacture my arm rest completely eliminates the assembly operations incident to the conventional multi-piece arm rests. Moreover, random disconformities hitherto thought harmful over, in the manufacture of seamless shells are overcome in my invention by forming the shell, the foam and the insert simultaneously, all in place, and under conditions in which the shell is expanded out to its correct size and shape while the insert is held rigidly where it belongs in the mold.

Another advantage not hitherto recognized as such relates to the longitudinally extending corners of the arm rest. By the rotational molding process, as I perform it, these corners receive a substantially thicker build-up of plastisol than do the flatter areas. This corner 22 takes the major force of the hand pressure in pulling on the arm rest when it is being employed to pull the vehicle door closed. The extra vinyl in this area fortifies the shell T against wear in its most vulnerable spot and also improves the longitudinal rigidity of the entire article.

The materials employed in making the arm rest of my invention are not exceptionally critical provided certain conditions are met. For instance, I employ in making the vinyl shells, a fusable plastisol which has substantial advantages over the plasticized thermoplastic vinyl coverings previously employed. Since my shells T are molded approximately to shape and need not be conformed to the thickness of the arm rest, I am not limited as to the thickness of covering I may employ. For instance, my shells T are approximately .035" thick, whereas conventional coverings are usually no greater than .020" thick. This added thickness enhances the durability of my arm rest, and also gives it a sturdier feeling without reducing its comfort in use.

It will likewise be understood that the general idea of the formation of the molds, preparation of the grain, etc. may be carried out with other materials besides vinyl plastisol, and that in some of its aspects my invention is not limited specifically on rotational molding, but can be performed by slush molding or other molding techniques. Secondly, in regard to the foam composition employed, I use a foaming polyurethane resin-diisocyanate mixture, but other substances of a like nature capable of foaming, filling out the cavity of the vinyl shell and intimate bonding will be suitable.

A further feature of my invention of considerable importance relates to the relationship between curing the shells T under conditions of heat and curing the foam at room temperature. Once the shells are formed, they should not be subjected to high heat both because they expand and because the heat tends to reduce the definition of the grain. Only by separately curing the shells and foam, and carrying out the foam cure under conditions relatively close to room temperature can the integral combination be made without harmful contraction taking place or reduction of grain definition.

From the foregoing description it will now be apparent to those skilled in the art that numerous minor variations of the preferred embodiments of my invention herein shown are possible, and accordingly, it is not my intention to confine the invention to the precise forms herein shown, but rather to limit it in terms of the appended claims.

Having thus described and disclosed preferred embodiments of my invention, what I claim as new and desire to secure by Letters Patent of the United States is:

1. An integral one-piece padded automobile arm rest comprising: a flexible substantially seamless plastic shell with a grained outer surface, an upper horizontal wear and pressure receiving surface with longitudinally extending corners, and a vertical side wall substantially at right angles to said wear and pressure receiving surface, the thickness of the plastic in said corners being substantially thicker than in other portions of the shell; a reinforcing and attaching member within said shell having a horizontal upper surface parallelly spaced from, substantially coextensive with and in supporting relation to said wear and pressure receiving surface forming a narrow cavity therebetween, and having a mounting bracket positioned relative to said vertical side wall and adapted to permit mounting of said vertical side wall against a side panel of an automobile; and a cured thermosetting resin foam completely and firmly filling said shell including said cavity, and intimately bonded to said shell and said reinforcing and attaching member.

2. The arm rest of claim 1 wherein the side wall opposite from said vertical side wall extends at an angle from said wear and pressure receiving surface to the lower edge of said vertical side wall, said arm rest thus being generally triangular in cross-section, and the opposite side wall has a recessed portion communicating with said mounting bracket and adapted to permit the insertion of a mounting screw therein.

3. An integral one-piece upholstered automobile interior element comprising a flexible substantially seamless cast plastic shell with a grained outer surface and a wear and pressure receiving surface; a reinforcing and attaching member within said shell having a surface substantially parallelly spaced from, substantially co-extensive with and in supporting relation to said wear and pressure receiving surface forming a cavity therebetween and having mounting means adapted to permit attachment to the interior of an automobile; and a cured resilient thermosetting resinous foam substantially completely and firmly filling said shell including said cavity and directly and intimately bonded to both said shell and to said reinforcing and attaching member.

4. The upholstered automobile element of claim 3 wherein said wear and pressure receiving surface has a longitudinally extending corner, the thickness of the cast plastic in said corner being substantially thicker than in other portions of the shell.

5. The upholstered automobile element of claim 3 wherein the plastic of said plastic shell is a fused vinyl plastisol, said reinforcing and attaching member is a metal stamping, and said thermosetting resinous foam is a polyurethane foam cured in situ.

6. The upholstered automobile element of claim 3 wherein said upholstered element is an arm rest with said wear and pressure receiving surface being substantially horizontal, said arm rest having a vertical side wall substantially at a right angle to said wear and pressure receiving surface and said mounting means being positioned relative to said vertical side wall to permit mounting of said vertical side wall against a side panel of an automobile.

7. The arm rest of claim 6 wherein the side wall opposite from said vertical side wall is at an angle inclined thereto and contains a recessed portion communicating with said mounting means and adapted to permit the insertion of a mounting screw therein.

References Cited in the file of this patent

UNITED STATES PATENTS

| | | |
|---|---|---|
| 2,802,519 | Jackell et al. | Aug. 13, 1957 |
| 2,838,100 | Follows | June 10, 1958 |

FOREIGN PATENTS

| | | |
|---|---|---|
| 627,089 | Canada | Sept. 12, 1961 |